Patented Feb. 21, 1950

2,498,434

UNITED STATES PATENT OFFICE 2,498,434

1-LOWER ALKYL-4-CYCLOHEXYL-4-LOWER FATTY ACYLOXY-PIPERIDINES AND ACID ADDITION SALTS THEREOF

John Lee, Essex Fells, and Leo Berger, Nutley, N. J., assignors to Hoffmann-La Roche Inc., Nutley, N. J., a corporation of New Jersey No Drawing. Application July 8, 1946, Serial No. 682,133

8 Claims. (Cl. 260—294)

The present invention relates to the production of N-tertiary-4-cyclohexyl piperidines which can be represented by the following formula:

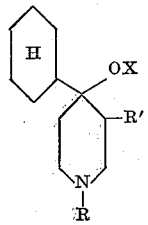

and their salts. In the above formula, R stands for an alkyl radical, as, for example, a straight chain or branched chain alkyl radical, R' stands for hydrogen or a lower alkyl group as, for example, methyl, ethyl and the like; and X stands for hydrogen or an acyl group as, for example, acetyl, propionyl, butyryl, valeryl, succinoyl, benzoyl, piperonyl, cinnamoyl, tropoyl, furoyl, p-amino-benzoyl and the like. The compounds in the above formula, when X is H are highly useful as intermediates for the preparation of organic compounds, for example, compounds of the above formula where X is acyl. The acyloxy compounds have analgesic and spasmolytic properties.

In Danish Patent No. 60,592, published February 15, 1943, there is described the manufacture of compounds of the structural formula:

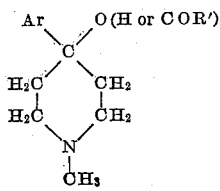

Ar being an aryl group, by a method which comprises reacting 1-methyl-4-piperidone with an aryl magnesium halide. While good yields have been obtained of the 4-aryl piperidinols by employing the aryl magnesium halides, we have found in our attempts to produce 4-cyclohexyl piperidines by employing cyclohexyl magnesium halides, that a secondary reaction occurs so that only a vanishingly small or no yield of the cyclohexyl piperidine compound is obtained.

According to the present invention, we have found that 1-alkyl-4-cyclohexyl-4-piperidinols can be prepared in excellent yield by direct hydrogenation of the corresponding 1-alkyl-4-phenyl-4-piperidinol salts. The reaction can be represented by the following scheme:

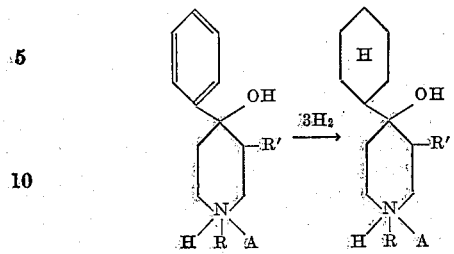

In the above formula, A is an anion of an organic or inorganic acid stronger than acetic acid, as, for example, Cl, $NO_3$, $HSO_4$, citrate, tartrate, ethane-sulfonate and similar anions. R and R' have the same significance as in the general formula A.

The hydrogenation of the 4-phenyl-4-piperidinol salts is preferably carried out in solution and in the presence of a catalyst, for example, a platinum catalyst at a temperature above 80° C. but below a temperature at which charring would occur, preferably in the range of 80–130° C. and at a superatmospheric pressure, preferably 500 pounds or upward. While lower pressures may be employed, lower temperatures are not as satisfactory. Other catalysts than platinum may be employed, as, for example, palladium. Any suitable solvents for the 4-phenyl-4-piperidinol salts can be employed, as, for example, water, alcohols, such as methanol, ethanol, isopropanol; dioxane, ethyl acetate, and the like.

The fact that cyclohexyl compounds are obtained according to our process is unexpected in that in applying the same reaction conditions directly to the esters of the 1-alkyl-4-aryl-4-piperidinols, none of the desired 1-alkyl-4-cyclohexyl-4-acyloxy compound can be isolated. This is believed to be due to hydrogenolysis occurring which eliminates the acyloxy group entirely. On applying the same reaction, however, to the unacylated 1-alkyl-4-phenyl-4-piperidinol, the described compounds were obtained—the tertiary hydroxyl group being surprisingly resistant to hydrogenolysis.

As specific examples of compounds that can be prepared by the above-described method are the following:

1-methyl-4-cyclohexyl-4-hydroxy piperidine
1-methyl-3-methyl-4-hydroxy-4-cyclohexyl piperidine
1-isopropyl-4-hydroxy-4-cyclohexyl piperidine
1-butyl-4-cyclohexyl-4-hydroxy piperidine, and their salts.

The above piperidinols and others obtained by the present method can be acylated by means of acid anhydrides or acyl halides to obtain the corresponding 1-alkyl-4-cyclohexyl-4-acyloxy piperidines. The acyl groups may be lower fatty-acyl residues, such as acetyl, propionyl, butyryl, valeryl, succinoyl, etc.; or may be lower aromatic acyl residues as, for example, benzoyl, piperonyl, etc.; or aryl-aliphatic as, for example, cinnamoyl, tropoyl; or substituted aromatic acyl such as p-amino-benzoyl; or heterocyclic acyl, as, for example, furoyl. These groups are introduced by acylating the 4-cyclohexyl piperidinols with the corresponding anhydrides and acyl chlorides.

EXAMPLE 1

*1-butyl-4-cyclohexyl-4-hydroxy-piperidine*

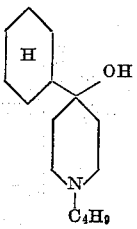

8.0 grams of 1-butyl-4-phenyl-4-hydroxy piperidine hydrochloride is dissolved in 100 cc. of alcohol and hydrogenated in the presence of Adam's platinum catalyst at 85° C. under pressure of 1100 lbs. of hydrogen for several hours. When the hydrogen absorption ceases the catalyst is filtered off and the alcoholic solution concentrated to dryness. The residue on recrystallization from acetone yields 1-butyl-4-cyclohexyl-4-hydroxy piperidine hydrochloride melting at 223.5–225.5° C.

The hydrochloride on treatment with alkali yields the base which on crystallization from normal hexane is obtained in the form of colorless needles melting at 96–98° C.

The crystalline base is converted to the 4-acyloxy compounds by treatment with an acid anhydride, catalyzed with a drop of sulfuric acid, on the steam bath for four hours. The products obtained are converted to the crystalline hydrochlorides and purified by recrystallization from a mixture of ethyl acetate and methanol. In this manner the 4-acetoxy, 4-propionoxy, and the 4-butyroxy derivatives of 1-butyl-4-hydroxy-4-cyclohexyl piperidine are prepared, by employing acetic, propionic, and butyric acid anhydrides, respectively as the acylating agents.

(a) 1-butyl-4-cyclohexyl-4-acetoxy piperidine hydrochloride, M. P. 229°–230°
(b) 1-butyl-4-cyclohexyl-4-propionoxy piperidine hydrochloride, M. P. 224°–225°
(c) 1-butyl-4-cyclohexyl-4-butyroxy piperidine hydrochloride, M. P. 202.5 (decomp.)

EXAMPLE 2

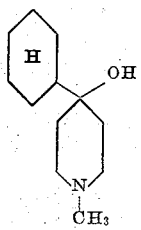

10 grams of 1-methyl-4-phenyl-4-hydroxy piperidine are mixed with 5 cc. of concentrated hydrochloric acid and 100 cc. of alcohol. This is hydrogenated at 80–90° C. at 600 lbs. pressure in the presence of 1 gram of Adam's platinum catalyst. After completion of the absorption of hydrogen, the catalyst is filtered off and the solution concentrated to dryness. The crystalline residue on recrystallization from acetone-methanol gives 1-methyl-4-cyclohexyl-4-hydroxy piperidine hydrochloride, M. P. 203–205° C.

The hydrochloride is converted to the free base and treated in the manner described with propionic anhydride and a drop of conc. $H_2SO_4$, on the steam bath for 4 hours. The product obtained is converted to the hydrochloride and purified by recrystallization from ethyl acetate and methanol to yield colorless crystals melting at 212°–214°. The product is 1-methyl-4-cyclohexyl-4-propionoxy piperidine hydrochloride.

EXAMPLE 3

*1-isopropyl-4-cyclohexyl-4-hydroxy piperidine*

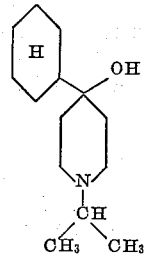

6.6 grams of 1-isopropyl-4-phenyl-4-hydroxy piperidine hydrochloride, obtained as described in application Serial No. 682,131, filed July 8, 1946 are dissolved in 100 cc. of alcohol and hydrogenated for 4 hours at 125° C. under the pressure of 1000 lbs. of hydrogen in the presence of 600 mg. of platinum oxide catalyst. The reaction absorbs the theoretical amount of hydrogen. The solution is then filtered from the catalyst and concentrated to dryness and the residue on recrystallization from acetone and methanol mixture yields colorless crystals having a M. P. 232–234° C. The product obtained is 1-isopropyl-4-cyclohexyl-4-hydroxy - piperidine hydrochloride.

The above compound can be acylated by heating the piperidinol base with propionic anhydride in pyridine solution for 3 hours under reflux. The product obtained is purified by recrystallization from acetone-methanol and occurs as colorless crystals melting 220–221° C. This compound is 1-isopropyl-4-cyclohexyl-4-propionoxy piperidine hydrochloride.

EXAMPLE 4

*1,3-dimethyl-4-cyclohexyl-4-hydroxy piperidine*

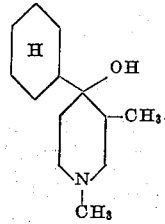

3 grams of 1,3-dimethyl-4-phenyl-4-hydroxy piperidine are dissolved in 100 cc. of alcohol and 1.5 cc. of concentrated hydrochloric acid is added. The solution is hydrogenated under 1000 pounds of pressure of hydrogen at 80° C. for 3 hours in the presence of 600 mg. of Adam's platinum catalyst. After cooling, the catalyst is removed by filtration and the filtrate is evaporated to dryness. The residual white salt, which corresponds to the formula of 1,3-dimethyl-4-cyclohexyl-4-hydroxy piperidine hydrochloride, recrystallized from acetone-methanol, melts at 243–244° C. The salt as obtained above is dissolved in water, alkalinized with sodium hydroxide and the resultant base is extracted with ether. The ethereal solution after drying over sodium sulfate is distilled down and the resultant free base dissolved in 10 cc. of propionic anhydride and one drop of concentrated sulfuric acid is added as a catalyst. The mixture is heated on a steam bath for 3 hours, the larger part of the propionic anhydride removed in vacuum, and the residue poured onto an ice bath. This is extracted with ether, the ethereal solution is dried over sodium sulfate for 12 hours, filtered and hydrogen chloride is passed into the filtrate. A hydrochloride separates out, which on recrystallization from ethyl acetate yields colorless, shiny crystals melting at 205–6° C. This compound corresponds to the formula for 1,3-dimethyl-4-cyclohexyl-4-propionoxy piperidine hydrochloride.

Instead of employing the piperidinol hydrochloride salt as the starting material in the above examples, one can employ other salts as, for example, the $NO_3$, $HSO_4$, citrate, tartrate and ethane sulfonate salts of the piperidinols. The salts are prepared by reacting the free piperidinol bases with the corresponding acids in a manner similar to that illustrated in the examples in connection with forming the hydrochloride salt.

We claim:

1. 1-lower alkyl-4-cyclohexyl-4-lower fatty acyloxy-piperidines and their acid addition salts.
2. 1-lower alkyl-4-cyclohexyl-4-lower fatty acyloxy-piperidine hydrochlorides.
3. 1-methyl-4-cyclohexyl-4-propionxy piperidine and the acid addition salts thereof.
4. 1,3-dimethyl-4-propionoxy-4-cyclohexyl piperidine and the acid addition salts thereof.
5. 1-isopropyl-4-propionoxy-4-cyclohexyl piperidine and the acid addition salts thereof.
6. 1-methyl-4-cyclohexyl-4-propionoxy-piperidine hydrochloride.
7. 1,3-dimethyl-4-propionoxy-4-cyclohexyl-piperidine hydrochloride.
8. 1-isopropyl-4-propionoxy-4-cyclohexyl-piperidine hydrochloride.

JOHN LEE.
LEO BERGER.

REFERENCES CITED

The following references are of record in the file of this patent:

UNITED STATES PATENTS

| Number | Name | Date |
| --- | --- | --- |
| 2,151,047 | Preisewerk et al. | Mar. 21, 1939 |

FOREIGN PATENTS

| Number | Country | Date |
| --- | --- | --- |
| 60,592 | Denmark | Feb. 1, 1943 |
| 309,300 | Great Britain | Apr. 11, 1929 |
| 409,732 | Great Britain | May 1, 1934 |

OTHER REFERENCES

Ser. No. 361,888, Scheuing et al. (A. P. C.) published April 20, 1943.